A. J. CONNER.
Churn.
No. 76,606.
Patented April 14, 1868.
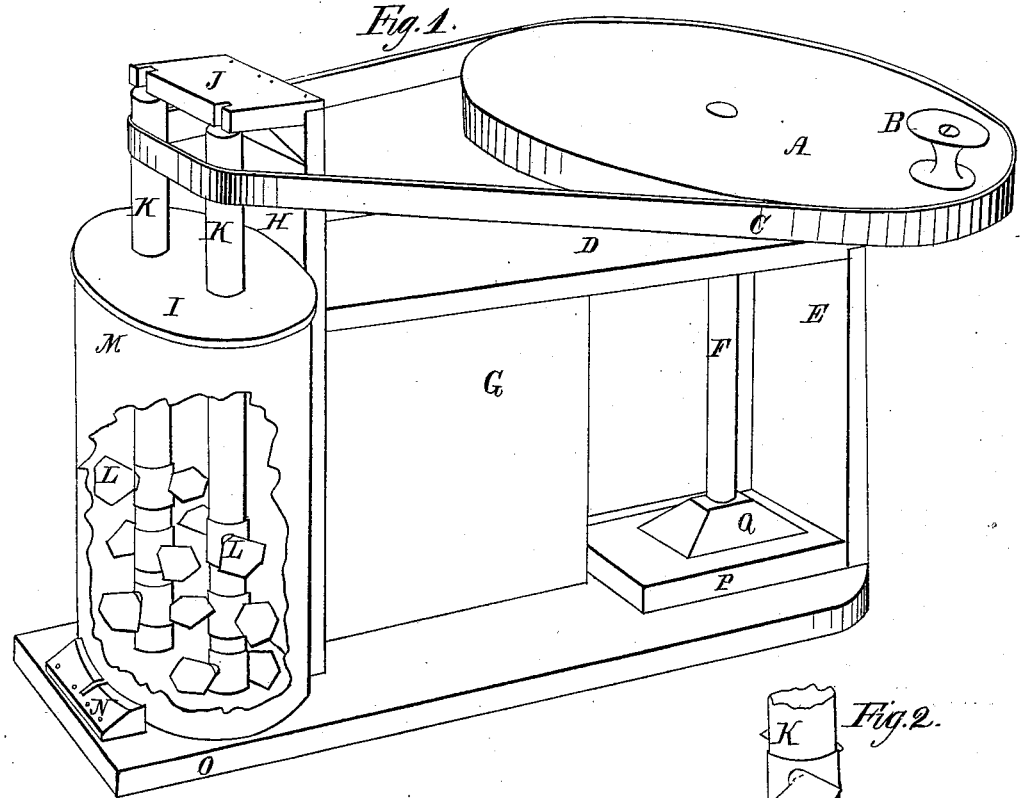
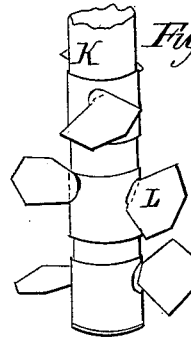
Witnesses
John C Carpenter
Isaiah W. Macarty
Inventor
Andrew J Conner

United States Patent Office.

ANDREW J. CONNER, OF LOUISVILLE, KENTUCKY.

Letters Patent No. 76,606, dated April 14, 1868.

IMPROVEMENT IN CHURNS.

*The Schedule referred to in these Letters Patent and making part of the same.*

TO ALL WHOM IT MAY CONCERN:

Be it known that I, ANDREW J. CONNER, of the city of Louisville, county of Jefferson, and State of Kentucky, have invented a new and useful Improvement in Churns, for churning butter, and for other purposes, entitled "Andrew J. Conner's Improved Double-Dasher Churn," and I do hereby declare that the following is a full, clear, and exact description of the construction of the same, reference being had to the accompanying drawings, and to the letters of reference marked thereon.

Figure 1 represents a perspective view of the churn and the machinery by which it is operated.

Figure 2 is a view of a section of one of the shafts or dashers, showing how the wings or blades are attached thereto, and showing their position.

M is the churn, in which the milk or cream is deposited. K K are the shafts or dashers. L L are the wings or blades, for the purpose of agitating the cream or milk, which blades are placed on the shafts K K in a spiral position, or at an angle of about forty-five degrees; and there are six on each shaft or dasher, and are made of wood or other material. I is the lid or cover of the churn, and is so adjusted as to be easily removed, so as to admit of the dashers being taken out when necessary. O is the bottom of the frame, on which the churn stands, and is held to its place by the block N. H is an upright piece behind the churn, in order to support it. J is a projecting piece from H, which receives the journals of the shafts or dashers K K. D is a horizontal piece, to support the frame of the machinery. P and Q are blocks, on which the upright shaft rests. A is the wheel, by which the power is applied to the churn by the belt C, which may be either of leather or gum, and is operated thereby.

The above churn is made of tin, and the shafts or dashers K K are made of wood, as also the machinery necessary to operate it. Said churn may be made of either wood or iron, and any kind of power can be used to propel it; and said churn is operated by first putting the dashers K K into the churn M, after which put the cream or milk into the churn M, and close it up by putting on the cover I, and afterwards put the belt C on the large wheel A, and around the shafts K K, after which apply the power to the wheel A by the hand, or otherwise; and, as it revolves, it will cause the dashers K K to revolve rapidly, and agitate the cream, and produce butter in a very short time.

The above is a full description of the operation of the above churn. Now, therefore, I do not claim anything as original, or as my improvement, in the construction of the machinery necessary to propel or operate said churn; but What I do claim as my improvement or invention, and desire to secure by Letters Patent, is—

The combination of the churn M, the shafts or double dashers K K, with the wings or blades L L, and the lid or cover I, when constructed, arranged, and operating in the manner set forth.

ANDREW J. CONNER.

Witnesses:
 JOHN E. CARPENTER,
 ISAIAH W. MACARTY.